US012669142B2

(12) United States Patent
Kuhn et al.

(10) Patent No.: US 12,669,142 B2
(45) Date of Patent: Jun. 30, 2026

(54) METHOD AND SYSTEM FOR LEVELING A FASTENING ELEMENT TO BE ANCHORED IN A SUBSTRATE

(71) Applicant: Hilti Aktiengesellschaft, Schaan (IL)

(72) Inventors: Martin Kuhn, Munich (DE); Christian Hefele, Breitenbrunn (DE); Oliver Baumann, Manly (AU)

(73) Assignee: Hilti Aktiengesellschaft, Schaan (LI)

( * ) Notice: Subject to any disclaimer, the term of this patent is extended or adjusted under 35 U.S.C. 154(b) by 434 days.

(21) Appl. No.: 18/548,431

(22) PCT Filed: Feb. 22, 2022

(86) PCT No.: PCT/EP2022/054355
§ 371 (c)(1),
(2) Date: Aug. 30, 2023

(87) PCT Pub. No.: WO2022/184497
PCT Pub. Date: Sep. 9, 2022

(65) Prior Publication Data
US 2024/0133405 A1    Apr. 25, 2024
US 2024/0229839 A9    Jul. 11, 2024

(30) Foreign Application Priority Data

Mar. 3, 2021    (EP) .................................... 21160510

(51) Int. Cl.
*F16B 5/02*      (2006.01)
*F16B 13/06*      (2006.01)

(52) U.S. Cl.
CPC ............ *F16B 5/0233* (2013.01); *F16B 13/06* (2013.01)

(58) Field of Classification Search
CPC ....... F16B 5/0233; F16B 13/06; F16B 13/141
(Continued)

(56) References Cited

U.S. PATENT DOCUMENTS 6,595,734 B2 * 7/2003 Duran ................... F16B 5/0208
411/435
7,114,901 B2 * 10/2006 Maruyama ............ F16B 5/0208
411/546
(Continued)

FOREIGN PATENT DOCUMENTS

DE      20118703 U1    2/2002
DE   10 2018 111 049    11/2019

OTHER PUBLICATIONS

International Search Report issued May 25, 2022, in PCT/EP2022/054355, with English translation, 6 pages.
(Continued)

*Primary Examiner* — Jason D Shanske
(74) *Attorney, Agent, or Firm* — Grüneberg Global IP, PLLC

(57) ABSTRACT

A method can be used for leveling a fastening element to be anchored in a substrate, with fastening element used, for example, for mounting a parapet or glazing. The method involves installing an anchor in the substrate; attaching an adjustment element that is height-adjustable along the anchor to the anchor; and arranging the fastening element on the adjustment element or the anchor in another position defined by the adjustment element. The method further involves leveling the fastening element by adjusting the adjustment element from above using a leveling adapter, which is arranged at least in part above the fastening element and can be gripped and operated from above, in particular by the adjustment element and the leveling adapter interlocking or being releasably interconnected through the fastening element. The method then involves removing the leveling adapter and/or fixing the fastening element to the anchor in the position adjusted in this manner.

18 Claims, 3 Drawing Sheets

(58) Field of Classification Search
USPC ......................................................... 411/378
See application file for complete search history.

(56)                     References Cited

U.S. PATENT DOCUMENTS

| 10,590,672 B2 | 3/2020 | Manos et al. |
| 2006/0193714 A1 | 8/2006 | Werner |
| 2021/0231144 A1 | 7/2021 | Jodeleit |

OTHER PUBLICATIONS

Written Opinion issued May 25, 2022, in PCT/EP2022/054355, with English translation, 9 pages.

\* cited by examiner

METHOD AND SYSTEM FOR LEVELING A FASTENING ELEMENT TO BE ANCHORED IN A SUBSTRATE

CROSS-REFERENCE TO RELATED APPLICATIONS

This application is the National Stage entry under § 371 of International Application No. PCT/EP2022/054355, filed on Feb. 22, 2022, and which claims the benefit of priority to European Application No. 21160510.0, filed on Mar. 3, 2021. The content of each of these applications is hereby incorporated by reference in its entirety.

BACKGROUND OF THE INVENTION

Field of the Invention

The invention relates to a method for leveling (i.e. properly aligning) a fastening element to be anchored in a substrate, the fastening element being able to be used, for example, for mounting a parapet or glazing. The fastening element can be, for example, a fastening plate or anchor plate, which is anchored in a substrate such as concrete by means of a chemical or mechanical anchor. The invention also relates to a corresponding system that is designed to carry out this method.

Description of Related Art

Leveling of anchor plates is a typical application when mounting, for example, parapets, safety rails, crash barriers, glazing, storage racks and much more. The actual application is quite time-consuming and unwieldy for the fitter. The main disadvantage of known mounting techniques is that a fastening element such as an anchor plate can usually only be properly aligned (leveled) in that an adjustment element, such as a leveling nut or a U-shaped spacer, arranged underneath the anchor must be adjusted by hand from the side or from below.

With known methods for mounting a parapet or glazing, etc., the following steps are typically required, which are shown by way of example in FIG. 1:

First, the anchors 1 themselves are installed, i.e. mounted on the substrate 2. For example, four anchors are used per attachment point, of which only one anchor 1 is shown in FIG. 1.

Subsequently, an additional nut 7 and a washer 3 are pre-mounted on each anchor 1 before a fastening element 4, e.g. a plate 4 to be fastened, is placed thereover it, i.e. on this washer 3.

In order to correctly align (level) the plate 4 to be fastened, these additional nuts 7 must now be adjusted in height one after the other, i.e. anchor 1 by anchor 1, from the side and thus from below the plate 4 to be fastened. This is usually extremely difficult and unwieldy.

Only after this has been carried out can the plate 4 to be fastened be fixed to the anchor 1, for example by means of a fixing threaded nut 5 with the washer 6 thereof.

In order to make leveling from below the fastening element 4 at least somewhat easier, some fitters also use U-shaped spacers 8 that attach to the anchor below the fastening element. U-shaped spacers 8 can be pushed in from the side, as illustrated in FIG. 2 using the example of a fastening element 4 for a parapet 9.

In the case of chemical anchoring using, for example, injection mortar or capsules, additional problems can also arise if the mortar gets into the anchor thread or other anchor parts such as expansion bolts, etc., the function of which could be impaired as a result.

SUMMARY OF THE INVENTION

The object of the present invention is, in order to solve the disadvantages and problems described, which are known from the prior art, to provide an alternative and/or improved method and system for leveling (i.e. for properly aligning) a fastening element to be anchored in a substrate, the fastening element being able be used, for example, for mounting a parapet or glazing.

This object is achieved by a method for leveling a fastening element to be anchored in a substrate, in particular a fastening element to be anchored in a substrate, as described below and by a corresponding system as described below. Preferred embodiments are also specified below. All the further features and effects mentioned in the description for the method can also apply to the system, and vice versa.

According to a first aspect, a method for leveling (i.e. properly aligning) a fastening element, such as a fastening plate, to be anchored in a substrate is provided, which method can be used, for example, for mounting a parapet or glazing. The method comprises the following basic steps, in addition to which further intermediate steps can be added if necessary:

First, a suitable anchor is installed, i.e. mounted, in the substrate. This can be an anchor rod, for example, which can have an external thread in a lower rod portion for fastening the anchor rod in the substrate and an external thread in an upper rod portion for attaching the fastening element and/or other mounting aids such as threaded nuts and washers on the anchor rod.

In the present description, terms such as "below, lower, from below, above, upper, from above, above, at, height, height-adjustable, etc," refer to a direction along the anchor or along the longitudinal axis therefore from the point of view of the fitter. In other words, the term "height" herein refers specifically to the direction in which the anchor is inserted into the substrate. This can typically be, but does not necessarily have to be, a vertical direction, since mounting on a sloping, irregular or vertical substrate is in principle equally possible with the method and system of the present invention as on a horizontal substrate.

In a further step, an adjustment element that is height-adjustable along the anchor is attached to the anchor. The adjustment element can, for example, be screwed onto an external thread of the anchor and thus be height-adjustable along the anchor.

The fastening element is then arranged, for example placed, on the adjustment element or on the anchor in another position or height defined by the adjustment element.

The fastening element can be in the form of an anchor plate, for example, on which a railing or a parapet or glazing can be fastened/mounted. In the present method and system, the fastening element can be fastened and positioned on the substrate in the manner described herein, in particular by means of a plurality of, for example, identical anchors. For the sake of simplicity, the method and system is described herein using one of these anchors as an example with associated mounting aids and mounting steps.

The leveling of the fastening element then takes place by the adjustment of the height-adjustable adjustment element using a specific leveling adapter which can be arranged at least in part above the fastening element and can therefore be operated from above. In particular, the adjustment element and the leveling adapter can interlock or be releasably interconnected through the fastening element. The leveling adapter can in particular have a gripping portion that fits the preferably height-adjustable adjustment element; a torque can be transmitted from the leveling adapter to the adjustment element via the gripping portion. In addition, a further gripping portion can be provided on a side of the leveling adapter opposite this gripping portion, on which further gripping portion a tool such as a wrench etc. for applying a torque required for adjustment can be applied, where the further gripping portion can be designed in the shape of a slit or hexagon or the like, for example.

Finally, the leveling adapter can be removed and/or the fastening element can be fastened, for example by means of a threaded nut, optionally with a further washer. Some examples of optional further intermediate steps of the method are specified below.

A concept of the invention consists in allowing the height-adjustable adjustment element to be adjusted from above, as a result of which leveling of the fastening element can be significantly simplified and/or improved for the fitter compared to conventional adjustment of the adjustment element from below the fastening element. This is made possible, for example, by using a leveling adapter designed to adjust the adjustment element from above.

The anchor can be designed in particular as a threaded rod and/or as an anchor rod and/or as a bolt anchor and/or as an expansion anchor and/or as an expansion dowel. The anchor can be designed in particular for use in non-cracked and/or cracked concrete as a substrate material and/or for use or for maximum performance with injection mortars and/or for standard applications in non-cracked concrete and/or for cracked concrete as a substrate material and seismic loads. It may be, for example, an anchor rod, for example made of carbon steel or other suitable material, designed, for example, to provide maximum performance with injection mortars for substrate material such as cracked or non-cracked concrete. It may also be, for example, a bolt anchor, for example made of carbon steel or other suitable material, designed, for example, for standard applications in non-cracked concrete and has an external thread only in the upper part (head) thereof. It may also be, for example, a heavy-duty expansion anchor, for example made of carbon steel or other suitable material, designed, for example, for cracked concrete and seismic loads, and having an external thread only in the upper portion (head) thereof.

Said leveling adapter can be designed, for example, as a sleeve adapter (see FIG. 3) which is designed to interlock with or connect to the adjustment element from above through a gap between the anchor and the fastening element in order to adjust the adjustment element. In this way, the height of the adjustment element can be easily adjusted from above in order to level the fastening element (anchor plate etc.) arranged or resting thereon.

According to one embodiment, the adjustment element comprises a leveling washer which is attached to the anchor, for example by being screwed onto an external thread. In this case, the adjustment element can comprise one or more predetermined breaking points which breaks/break away when a predetermined threshold torque is exceeded when the leveling adapter is actuated. Such a predetermined breaking point can be provided, for example, on an internal thread of the adjustment element, such as a leveling washer or threaded nut. The predetermined breaking point can in particular ensure that a force applied to pre-tighten the adjustment element is passed on to system components located further down on the anchor, such as the lower rod portion thereof embedded in the substrate.

According to one embodiment, the adjustment element has, in addition to the leveling washer, a pipe portion which is rigidly connected to the leveling washer, the pipe portion having an internal thread which can be brought into engagement with the external thread of the anchor. The forces introduced can be distributed over a greater length in the direction of extension of the anchor by means of the pipe portion. In addition, the pipe portion can protect at least a large part of the external thread of the anchor, in particular the entire external thread of the anchor, from contact with a mortar. In this case, the pipe portion in particular has an extension in the axial direction of the anchor which is large compared to the leveling washer, which extension is preferably a multiple of the extension of the leveling washer in the axial direction.

According to one embodiment, the anchor is designed for use or for maximum performance with injection mortar. In order to protect the anchor from penetration of the mortar into its external thread or other anchor parts such as expansion bolts, etc. and/or to transmit a torque applied by the leveling adapter to the adjustment element to system components located further down on the anchor, such as the lower rod portion thereof embedded in the substrate, in this embodiment, before attaching the adjustment element to the anchor, a suitable pipe part or a pipe material cut to a suitable length is attached to the anchor, in particular pushed over the anchor thread thereof. The pipe part or the pipe material is in particular a component that is independent of the adjustment element. The suitable length can correspond, for example, to a distance from the substrate to the fastening element, so that after the fastening element has been leveled, mortar can be injected or poured on the outside of the pipe part/pipe material between the substrate and the fastening element.

In particular, after a predetermined mortar hardening time of the grouting mortar, for example, the anchor fastened in the substrate can be prestressed by applying a torque to the top nut. In applications in which a prestress of the anchor is to be achieved, a pipe pushed over the anchor or a sleeve pushed over the anchor or the adjustment element having a pipe portion can be provided for this purpose.

According to a further aspect, a system is provided for leveling a fastening element, such as a fastening plate or anchor plate, to be anchored in a substrate, for example for mounting a parapet or glazing. The system is designed to carry out a method of the type presented herein and can in particular comprise the following:

at least one anchor, which is designed to be installed in the substrate;

for each anchor, an adjustment element which is designed to be attached to the anchor for positioning the fastening element; and a leveling adapter, the adjustment element and the leveling adapter being designed in such a way that the adjustment element is adjustable for leveling a fastening element arranged thereon and/or fixed in its position in relation thereto by means of the leveling adapter, which is arranged at least in part above the fastening element and can be actuated from above, in particular by the adjustment element and the leveling adapter interlocking or being releasably interconnected through the fastening element.

In particular, the system can also comprise a fastening element, for example an anchor plate, suitable for mounting a parapet or glazing. This fastening element is designed to be arranged on the adjustment element or on the anchor in another position defined by the adjustment element. However, the system described herein can also be manufactured and marketed without the fastening element mentioned, in order to be used in the manner described for leveling a fastening element, which can be selected individually for a desired application at the installation site.

In the present method and system, the fastening element can be fastened and positioned on the substrate in the manner described herein, in particular by means of a plurality or a large number of, for example, identical anchors.

In particular, the system can also be designed to carry out a method according to the embodiment described above for use with anchor systems which, for example, require a prestress due to their function. For this purpose, the system can additionally comprise, for each anchor, a suitable pipe part or pipe material that can be cut to a suitable length, corresponding to a desired distance from the substrate to the fastening element, and which is designed to be introduced onto the anchor, for example pushed or plugged or screwed on, in particular via the anchor thread thereof, before the adjustment element is attached thereto. As an alternative to this, the pipe element can be designed in one piece with the adjustment element and preferably designed to interact via an internal thread with an external thread of the anchor.

BRIEF DESCRIPTION OF THE DRAWINGS

The above aspects of the invention and the embodiments and specific configurations thereof are explained in more detail below with reference to the examples shown in the accompanying drawings. The drawings are schematic. Said drawings may, but do not have to, be understood to be true to scale. The same reference signs represent the same elements or elements that correspond to one another in terms of the function thereof. In the drawings.

DETAILED DESCRIPTION OF THE INVENTION

Figure 1:
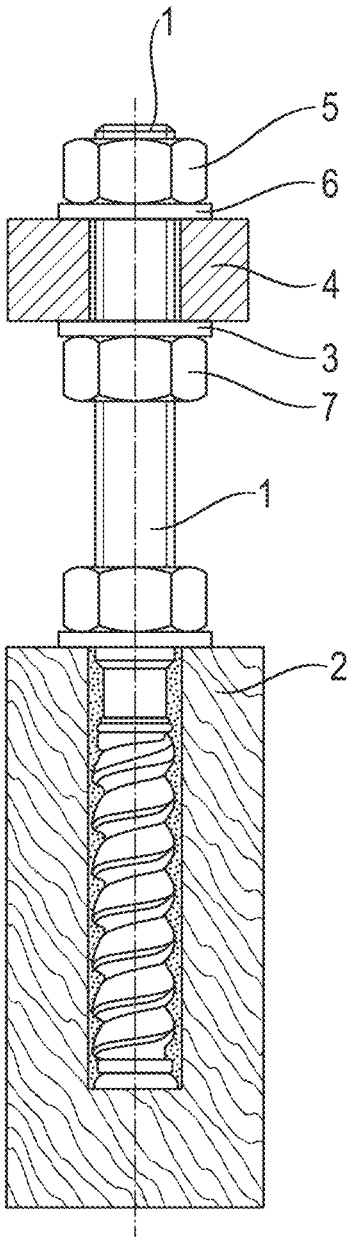
FIG. 1 shows a system and individual steps of a method known from the prior art for mounting a parapet or glazing.

All of the various embodiments, variants and specific design features of the method according to the first aspect of the invention and the corresponding system mentioned above in the description can be implemented in the examples shown in the drawings, in particular alternatively or additionally. They are therefore not all repeated again below. The same applies, mutatis mutandis, to the definitions of terms and effects already specified above in relation to individual features of the method and system according to the invention.

Figure 2:
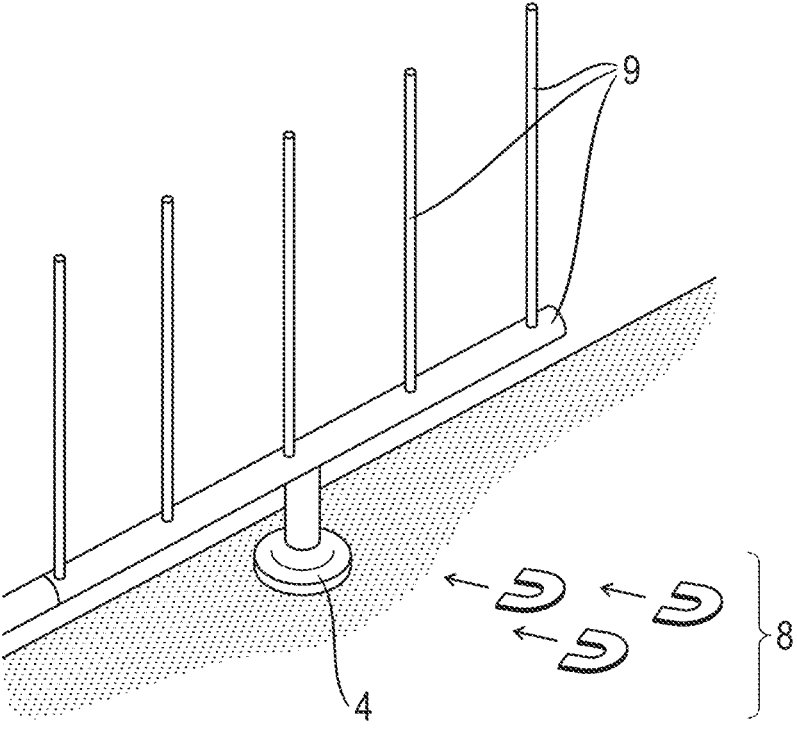
FIG. 2 shows an example known from the prior art for leveling a fastening element for a parapet by means of laterally inserted U-shaped spacers.

While FIGS. 1 and 2 explain the known prior art and have already been described at the outset, FIG. 3 (below) shows a side cross-sectional view of a system 10 and individual steps of a method of the type set out herein provided for leveling a fastening element 4 to be anchored in a substrate 2, which fastening element can be used, for example, for mounting a parapet or glazing (not shown). An adjustment element 11 in the form of a leveling washer and a leveling adapter 12 used to adjust said adjustment element are also shown in an enlarged perspective exploded view at the top of FIG. 3.

Figure 3:
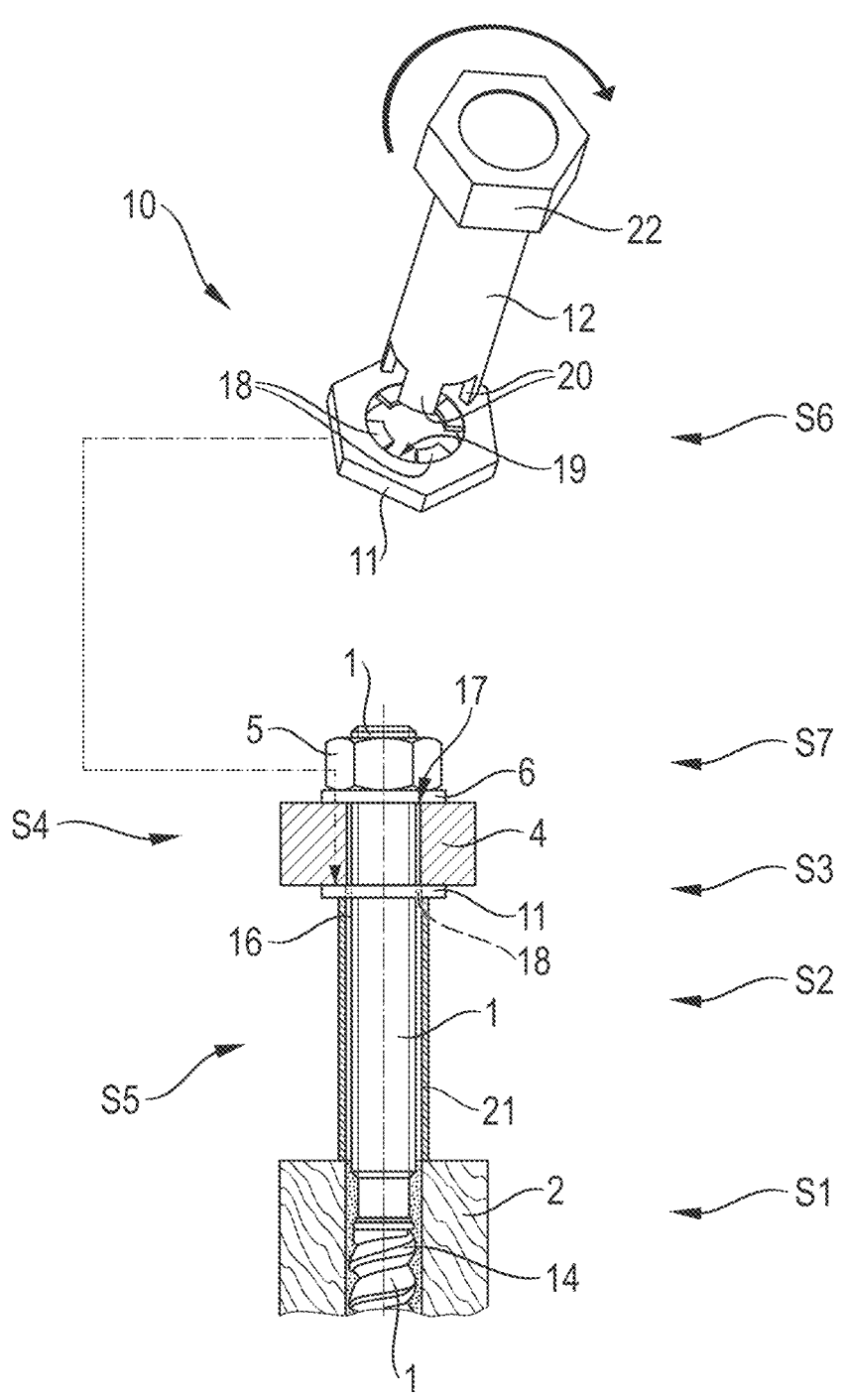
FIG. 3 shows an example of a method and system according to the present invention for leveling a fastening element to be anchored in a substrate, which fastening element can be used, for example, for mounting a parapet or glazing.

In this example, the system 10 shown in FIG. 3 comprises at least one anchor 1, which is designed to be installed in the substrate 2, for example concrete. Here, purely by way of example, the anchor 1 is an anchor rod which is designed for maximum performance with injection mortars for substrate material such as cracked or non-cracked concrete. The anchor 1 comprises, in a lower rod portion, a cone-shaped portion 14 for fastening the anchor 1 in the substrate 2 and, in an upper rod portion, an external thread 16, the thread turns of which cannot be seen in detail in FIG. 3, for attaching the fastening element 4 and other mounting aids such as threaded nuts and washers, which are described below.

For each anchor 1, the system 10 has an adjustment element 11, for example in the form of a leveling washer, which in this example is attached to the anchor 1 in a height-adjustable manner by being screwed onto the external thread 16. The fastening element 4, in this example a fastening plate or anchor plate, is arranged on the adjustment element. The fastening element 4 can be leveled, i.e. aligned, by adjusting the adjustment element 11. In the present method and system, the fastening element 4 can be fastened and positioned on the substrate 2 in the manner described herein, in particular by means of a plurality or even a large number of, for example, identical anchors 1. For the sake of simplicity, the method and system is described herein using one of these anchors 1 as an example with associated mounting aids and mounting steps.

In order to adjust the adjustment element 11, the system comprises a leveling adapter 12, in this example a sleeve adapter which is designed to interlock with or connect to the adjustment element 11 from above through a gap 17 between the anchor 1 and the fastening element 4 in order to adjust the adjustment element 11. In this way, the height of the adjustment element 11 can be easily adjusted from above in order to level the fastening element 4 resting thereon.

In order to interact with the leveling adapter 12, in the present case the adjustment element 11 has a plurality of projections 18 distributed around the periphery, which are designed to interact with projections 20 projecting in the axial direction. A torque can be transmitted to the adjustment element 11 via the leveling adapter 12.

The projections 18 of the adjustment element 11 can optionally be designed as predetermined breaking points, with these being designed in such a way that the projections 18 break when a predetermined threshold torque is exceeded when the leveling adapter 12 is actuated. The predetermined breaking point 18 can in particular ensure that a force applied to pre-tighten the adjustment element 11 is passed on to system components located further down on the anchor 1, such as the lower rod portion thereof embedded in the substrate 2.

In this example, the system 10 is designed to use the anchor 1 with injection mortar. For this purpose, the system 10 additionally comprises cuttable pipe material 21, which can be cut off to a length corresponding to a desired distance from the substrate 2 to the fastening element 4, for example. The pipe material 21 is designed to be pushed or slipped onto the anchor 1 via the external thread 16 thereof before the adjustment element 11 is attached thereto.

In an alternative embodiment, it can be provided that the adjustment element 11 also has the pipe material 21 or a pipe portion in addition to the leveling washer. The pipe portion 21 preferably has an internal thread which can be brought into engagement with the external thread 16 of the anchor 1, the adjustment element 11 comprising the pipe portion 21 being operable by the leveling adapter 12 in the manner described in more detail above.

In the following, with reference to FIG. 3, a method of the type presented herein for leveling fastening element 4 to be anchored to the substrate 2 using the system 10 is illustrated:

The anchor 1 is installed in the substrate 2 in a step S1. The portion 14 of the anchor 1 provided in the lower rod portion, designed in a cone shape in this case, is used for this purpose.

In a further step S2, the pipe material 21 is cut or torn to a suitable length and pushed over the external thread 16 of the upper rod portion of the anchor 1. Subsequently, in a step S3, the adjustment element 11 is screwed onto the external thread 16 of the anchor 1 up to the stop and/or until it engages with the pipe material 21. The pipe material 21 can protect the anchor 1 from penetration of the mortar (at step 35).

In a further step S4, the adjustment element 11 is screwed onto the anchor 1, the fastening element 4 is placed on the anchor 1 and the fastening element 4 is leveled using the leveling adapter 12 by adjusting the adjustment element 11 from above (from the point of view of the fitter).

In a preferred embodiment, the adjustment member 11 comprises the pipe material 21 or the pipe portion 21, the pipe portion 21 being formed in one piece with the leveling washer. An internal thread of the adjustment element 11, which also extends over the pipe portion 21, can be brought into engagement with the external thread 16 of the anchor 1, If necessary, a desired adjustment of an axial length of the pipe portion 21 can be carried out beforehand.

The leveling adapter 12 has a gripping portion 22, which is arranged above the fastening element 4 from the point of view of the fitter and has a hexagonal shape, to which a tool such as a wrench etc. for applying a torque required for adjustment (as indicated by a rotary arrow in FIG. 3) can be applied. The leveling adapter 12 interacts with the adjustment element 11 via a further gripping portion, which is opposite the gripping portion 22, in the manner described in more detail above, whereby a torque can be transmitted from the leveling adapter 12 to the adjustment element 11.

After leveling, in a step S5 mortar is injected or poured on the outside of the pipe material 21 between the substrate 2 and the fastening element 4. After the required curing time of the mortar, the leveling adapter 12 can be actuated with a desired torque in a step S6. Alternatively or additionally, provision can be made for the leveling adapter 12 to be actuated in order to exceed a threshold torque in such a way that a predetermined breaking point 18 of the adjustment element 11 breaks away. The leveling adapter 12 can then be removed and the fastening element 4 can be fixed on the anchor 1 in a step S7 by means of a fixing threaded nut 5, optionally with a further washer 6.

In a step S7, the fastening element 4 is fixed to the substrate by means of a fixing threaded nut 5 and optionally another washer 6; in the case of anchor systems which require a prestress, this can be introduced into the functional part located in the substrate, in particular the cone-shaped portion 14.

In addition to the applications of the method for leveling a fastening element according to the invention, which are mentioned herein by way of example and which can be used for mounting a parapet or glazing, the method can also be used for other types of applications which also require leveling of a fastening element anchored in the substrate.

The invention claimed is:

1. A method for leveling a fastening element to be anchored in a substrate, the method comprising:
   installing an anchor in the substrate;
   attaching an adjustment element that is height-adjustable along the anchor to the anchor;
   arranging the fastening element on the adjustment element or on the anchor in another position defined by the adjustment element;
   leveling the fastening element by adjusting the adjustment element from above using a leveling adapter, which is arranged at least in part above the fastening element and is configured to be gripped and operated from above; and
   removing the leveling adapter and/or fixing the fastening element to the anchor in the position adjusted in this manner, wherein
   the anchor is designed for use with chemical and mechanical anchoring systems;
   before the adjustment element is attached, a pipe part or pipe material cut to a suitable length, corresponding to a distance from the substrate to the fastening element, is introduced on the anchor; and
   after the fastening element has been leveled mortar is introduced or injected on the outside of the pipe part or pipe material between the substrate and the fastening element.

2. The method according to claim 1, wherein the anchor is designed
   as a chemical anchor having a threaded rod; and/or
   as a bolt anchor; and/or
   as an expansion anchor; and/or
   as an undercut anchor; and/or
   as a screw anchor; and/or
   for use in uncracked and/or cracked concrete as a substrate material; and/or
   for dynamic or seismic loads.

3. The method according to claim 1, wherein the fastening element is designed as an anchor plate.

4. The method according to claim 1, wherein the leveling adapter
   is a sleeve adapter which is designed to interlock with or connect to the adjustment element from above through a gap between the anchor and the fastening element in order to adjust the adjustment element, and/or
   has a gripping portion arranged above the fastening element, with which a tool for applying a torque required for adjustment is configured to engage.

5. The method according to claim 1, wherein the adjustment element comprises a leveling washer.

6. The method according to claim 5, wherein the adjustment element has, in addition to the leveling washer, a pipe portion which is rigidly connected to the leveling washer, the pipe portion having an internal thread which is configured to can be brought into engagement with an external thread of the anchor.

7. The method according to claim 1, wherein after a predetermined mortar hardening time, a prestress is transferred to the anchor by a fixing threaded nut, optionally having a further washer.

8. The method according to claim 1, wherein the fastening element is a fastening element for mounting a parapet or glazing.

9. The method according to claim 1, wherein the adjustment element and the leveling adapter interlock or releasably interconnect through the fastening element.

10. The method according to claim 4, wherein the gripping portion is in the shape of a slit or hexagon.

11. The method according to claim 5, wherein the leveling washer is attached by screwing onto an external thread of the anchor.

12. The method according to claim 1, wherein the pipe part or pipe material is introduced on the anchor via an anchor thread thereof.

13. A system for leveling a fastening element to be anchored in a substrate, wherein the system is designed to carry out the method according to claim 1 and, for this purpose, comprises the following:

at least one anchor, which is designed to be installed in the substrate;

for each anchor, the adjustment element which is designed to be attached to the anchor for positioning the fastening element; and the leveling adapter, wherein the adjustment element and the leveling adapter are designed in such a way that the adjustment element is adjustable for leveling the fastening element arranged thereon and/or fixed in its position in relation thereto by the leveling adapter, which is arranged at least in part above the fastening element and which is configured to can be actuated from above, wherein the system is designed for use with chemical and mechanical anchoring systems and for this purpose, comprises the following:

for each anchor, the pipe part or pipe material that is configured to be cut to a suitable length, corresponding to a desired distance from the substrate to the fastening element, and that is designed to be pushed onto the anchor.

14. The system according to claim 13, further comprising the fastening element which is designed to be arranged on the adjustment element or on an anchor in another position defined by the adjustment element.

15. The system according to claim 13, wherein the fastening element is a fastening element for mounting a parapet or glazing.

16. The system according to claim 13, wherein the fastening element is an anchor plate.

17. The system according to claim 13, wherein the adjustment element and the leveling adapter interlock or releasably interconnect through the fastening element.

18. The system according to claim 13, wherein the pipe part or pipe material is configured to be pushed onto the anchor via an anchor thread thereof.

* * * * *